(12) United States Patent
Omara

(10) Patent No.: US 10,354,045 B2
(45) Date of Patent: Jul. 16, 2019

(54) MODELING 3D PHYSICAL CONNECTIVITY INTO PLANAR 2D DOMAIN TO IDENTIFY VIA REDUNDANCY

(71) Applicant: GLOBALFOUNDRIES INC., Grand Cayman (KY)

(72) Inventor: Ahmed Abdelghany Alsayed Omara, Dresden (DE)

(73) Assignee: GLOBALFOUNDRIES INC., Grand Cayman (KY)

( * ) Notice: Subject to any disclaimer, the term of this patent is extended or adjusted under 35 U.S.C. 154(b) by 133 days.

(21) Appl. No.: 15/624,764

(22) Filed: Jun. 16, 2017

(65) Prior Publication Data

US 2018/0365366 A1  Dec. 20, 2018

(51) Int. Cl.
| | | |
|---|---|---|
| G06F 17/50 | (2006.01) | |
| H01L 23/00 | (2006.01) | |
| H01L 27/00 | (2006.01) | |
| H05K 1/00 | (2006.01) | |
| H05K 3/00 | (2006.01) | |
| H01L 27/02 | (2006.01) | |
| H01L 23/522 | (2006.01) | |
| H01L 23/528 | (2006.01) | |
| H05K 1/11 | (2006.01) | |
| H01L 27/118 | (2006.01) | |
| H05K 3/40 | (2006.01) | |

(52) U.S. Cl.
CPC ........ *G06F 17/5081* (2013.01); *H01L 23/528* (2013.01); *H01L 23/5226* (2013.01); *H01L 27/0207* (2013.01); *H01L 27/11807* (2013.01); *H05K 1/115* (2013.01); *H05K 3/0005* (2013.01); *G06F 17/5068* (2013.01); *G06F 2217/74* (2013.01); *H01L 2027/11875* (2013.01); *H05K 3/4038* (2013.01)

(58) Field of Classification Search
None
See application file for complete search history.

(56) References Cited

U.S. PATENT DOCUMENTS

| | | | | |
|---|---|---|---|---|
| 6,804,808 B2 * | 10/2004 | Li | ............... | G06F 17/5081 716/136 |
| 6,810,510 B2 * | 10/2004 | Bakarian | ............... | G06F 17/5081 700/110 |
| 6,832,360 B2 * | 12/2004 | Li | ............... | G06F 17/5081 716/112 |

(Continued)

*Primary Examiner* — Leigh M Garbowski
(74) *Attorney, Agent, or Firm* — Gibb & Riley, LLC; David A. Cain, Esq.

(57) ABSTRACT

An integrated circuit (IC) design is received. The IC design has devices on different layers electrically connected to each other by conductive vias extending between the different layers. Relative locations of the vias, and of conductive components of the devices within adjacent layers of the different layers, are identified. The conductive components that overlap redundant vias are also identified. This allows 2D via checker data, that is a combination of the 3D adjacent layers, to be generated. The 2D via checker data includes rectangular geometric shapes that represent each instance of the conductive components overlapping redundant vias. Thus, the 2D via checker data is output, and lack of rectangular geometric shapes in the 2D via checker data provides data of locations in the IC design that fail to have redundant vias.

20 Claims, 11 Drawing Sheets

(56) References Cited

U.S. PATENT DOCUMENTS

| | | | |
|---|---|---|---|
| 6,883,149 B2 * | 4/2005 | Li | G06F 17/5081 |
| | | | 716/112 |
| 6,941,528 B2 * | 9/2005 | Allen | G06F 17/5068 |
| | | | 716/122 |
| 7,007,258 B2 * | 2/2006 | Li | G06F 17/5068 |
| | | | 716/122 |
| 7,096,447 B1 | 8/2006 | Li et al. | |
| 7,308,669 B2 * | 12/2007 | Buehler | G06F 17/5068 |
| | | | 716/112 |
| 7,669,152 B1 | 2/2010 | Tcherniaev et al. | |
| 7,765,510 B2 * | 7/2010 | Ohtsuka | G06F 17/5077 |
| | | | 716/129 |
| 8,381,156 B1 | 2/2013 | Beakes et al. | |
| 8,984,470 B2 | 3/2015 | Chakanakar et al. | |
| 2009/0300561 A1 | 12/2009 | Tong et al. | |

\* cited by examiner

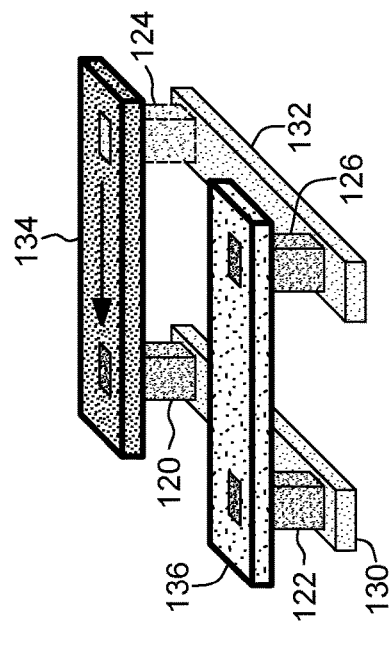
FIG. 5A
FIG. 5B
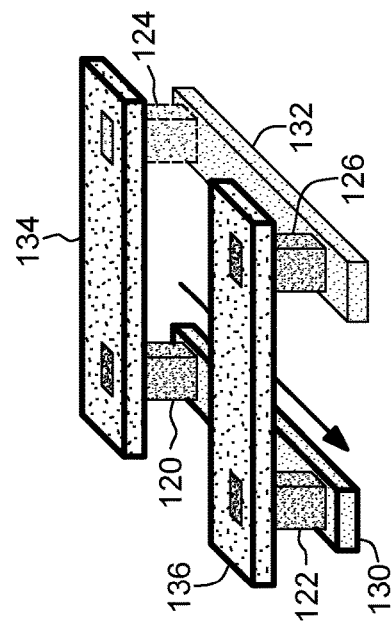
FIG. 5C
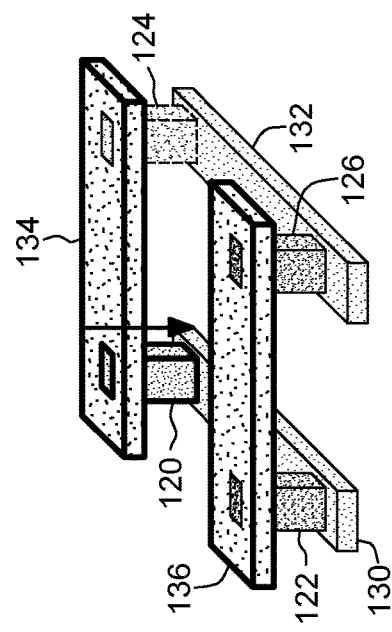
FIG. 5D

MODELING 3D PHYSICAL CONNECTIVITY INTO PLANAR 2D DOMAIN TO IDENTIFY VIA REDUNDANCY

BACKGROUND

Field of the Invention

The present disclosure relates to semiconductor design, and more specifically, to assisting in the identification of redundant vias, and areas without redundant vias.

Description of Related Art

In semiconductor creation, the physical design is described by what is called "layout." The layout is formed of shapes. Each shape is associated to a geometrical 3D level called "layer." Layers are either conductive or non-conductive. Conductive layers are made of low resistance metals. Metals are used to connect devices, pins, or different components together. Because the physical design is very small, dense, and complex, it is not possible to use one metal layer for routing. Thus, in advanced technologies, many metal layers are used. But since metal layers are separated in 3D, and different levels isolated from each other, it is often useful to connect metals from a lower level to other metals in upper levels, and so on. This connection is accomplished by a special type of layer (actually an inter-layer) that includes holes filled with metal. These inter-layers metal connectors are known as vias. If a via connecting two polygons is not correctly printed or fabricated, that will lead to design or chip failure. Therefore, it is always recommendable to compensate the link or connection between connected metal polygons by using redundant connections.

SUMMARY

Various methods herein receive an integrated circuit (IC) design into an input/output of a computerized device. The IC design has devices on different layers electrically connected to each other by conductive vias extending between the different layers.

These methods identify relative locations of the vias and of conductive components of the devices within adjacent layers (using a processor of the computerized device). In some examples, the conductive components run parallel and perpendicular to one another in the different layers. The process of identifying the relative locations of the vias and of the conductive components includes aligning two-dimensional representations of the adjacent layers and a corresponding two-dimensional representation of the conductive vias.

Such methods determine which of the conductive components within the adjacent layers overlap redundant vias (using the processor). When determining which of the conductive components overlap locations of redundant vias, these methods identify where the conductive components and the conductive vias overlap when the two-dimensional representations of the adjacent layers and the corresponding two-dimensional representation of the conductive vias are all aligned.

This allows these methods to generate via checker data that is a combination of the adjacent layers. The via checker data includes closed-loop rectangular geometric shapes (an unbroken loop of connected shapes) that represent each instance of the conductive components overlapping redundant vias, and open-loop rectangular geometric shapes (a broken loop of disconnected shapes) that represent each instance of the conductive components failing to overlap redundant vias. Further, the rectangular geometric shapes are different from any shapes used to represent the devices or the vias.

The rectangular geometric shapes in the via checker data provide data of locations in the IC design that have redundant vias, where the loop of the geometric shapes is closed, and an open loop in the rectangular geometric shapes in the via checker data provides data of non-redundant via locations in the IC design, that do not have (fail to have) the redundant vias. Data of such non-redundant via locations is output from the input/output to a layout designer, who can manually fix the non-redundant vias, or who can automatically do so, using a via redundancy generator. The via checker data is a diagnostic tool, and is not a layer of the IC design and is different from the different layers of the IC design.

Embodiments herein also include a computerized device that includes, among other components, a processor, an input/output electrically connected to the processor, etc. With devices herein, the input/output receives an integrated circuit (IC) design. Again, the IC design has devices on different layers electrically connected to each other by conductive vias extending between the different layers.

The processor identifies relative locations of the vias and of conductive components of the devices within adjacent layers of the different layers. Once again, the conductive components can run parallel and perpendicular to one another in the different layers. The processor identifies the relative locations of the vias and of conductive components by aligning two-dimensional representations of the adjacent layers and a corresponding two-dimensional representation of the conductive vias.

Also, the processor determines which of the conductive components within the adjacent layers overlap redundant vias of the conductive vias. The processor determines which of the conductive components overlap locations of redundant vias by identifying where the conductive components and the conductive vias overlap when the two-dimensional representations of the adjacent layers and the corresponding two-dimensional representation of the conductive vias are aligned.

With this, the processor generates via checker data of a combination of the adjacent layers that includes closed-loop rectangular geometric shapes representing each instance of the conductive components overlapping redundant vias, and open-loop rectangular geometric shapes (an broken loop of disconnected shapes) that represent each instance of the conductive components failing to overlap redundant vias. Also, the rectangular geometric shapes are different from any shapes used to represent the devices or the vias.

Thus, the rectangular geometric shapes in the via checker data provide data of locations in the IC design that have redundant vias where the loop of the geometric shapes is closed, and an open loop in the rectangular geometric shapes in the via checker data provides data of non-redundant via locations in the IC design, that do not have the redundant vias. The input/output outputs data of such non-redundant via locations to a layout designer, who can manually fix the non-redundant vias, or who can automatically do so, using a via redundancy generator.

BRIEF DESCRIPTION OF THE DRAWINGS

The embodiments herein will be better understood from the following detailed description with reference to the drawings, which are not necessarily drawn to scale and in which.

DETAILED DESCRIPTION

As mentioned above, if a via connecting two polygons is not correctly printed or fabricated, that will lead to design or chip failure. Therefore, it is always recommendable to compensate the link or connection between connected metal polygons by using redundant connections. Thus, one objective in any fabrication process is to increase the yield. Yield is defined as the ratio between the number of correctly functioning chips to the total number of chips in each wafer.

Each design is checked before fabrication, in the computer aided design (CAD) domain, using set of Design For Manufacturability rules (DFM). A mathematical yield model, that is function of failure rate (per failure type) and number of defects or failures, can also be used. A semiconductor design is considered acceptable when the mathematically calculated yield score passes a certain value. So, accuracy in calculating number of failures is critically important to obtain high yield.

One of the failures detected by such mathematical yield models is non-redundant vias. However, it can be very difficult to identify when redundant vias are present because a redundant path can occur in multiple layers through alternative electric paths. Therefore, it is possible to locate redundant vias through analysis of the 3D constructs; however, such is not possible using 2D CAD tools, because such tools do not identify redundant vias that result from a redundant path running through multiple layers of the semiconductor design.

In view of this, the methods and systems herein transform the 3D structures within a semiconductor design into 2D models. This 2D model is thus easily processed by geometrical checking applications, such as any Design Rule Checking (DRC) tool. With the methods and systems herein, the 3D semiconductor devices are split into logical parts, a 2D model is created for each 3D part (MX/MX+1/Via are modeled together), and redundant 3D connectivity paths are modeled as a 2D closed ring. Doing so transforms completely the 3D problem into pure 2D domain, opening a wide door for detecting redundant vias through normal DRC code, using simple geometric commands. Therefore, the methods and systems herein verify the correctness of a specific feature (called "via redundancy") in a given IC layout design under test. Flaws opposite to this feature are called "via singularity." Fixing of the layout design can be performed manually or through other redundant vias insertion tools using output from the systems and methods herein.

Figure 1:
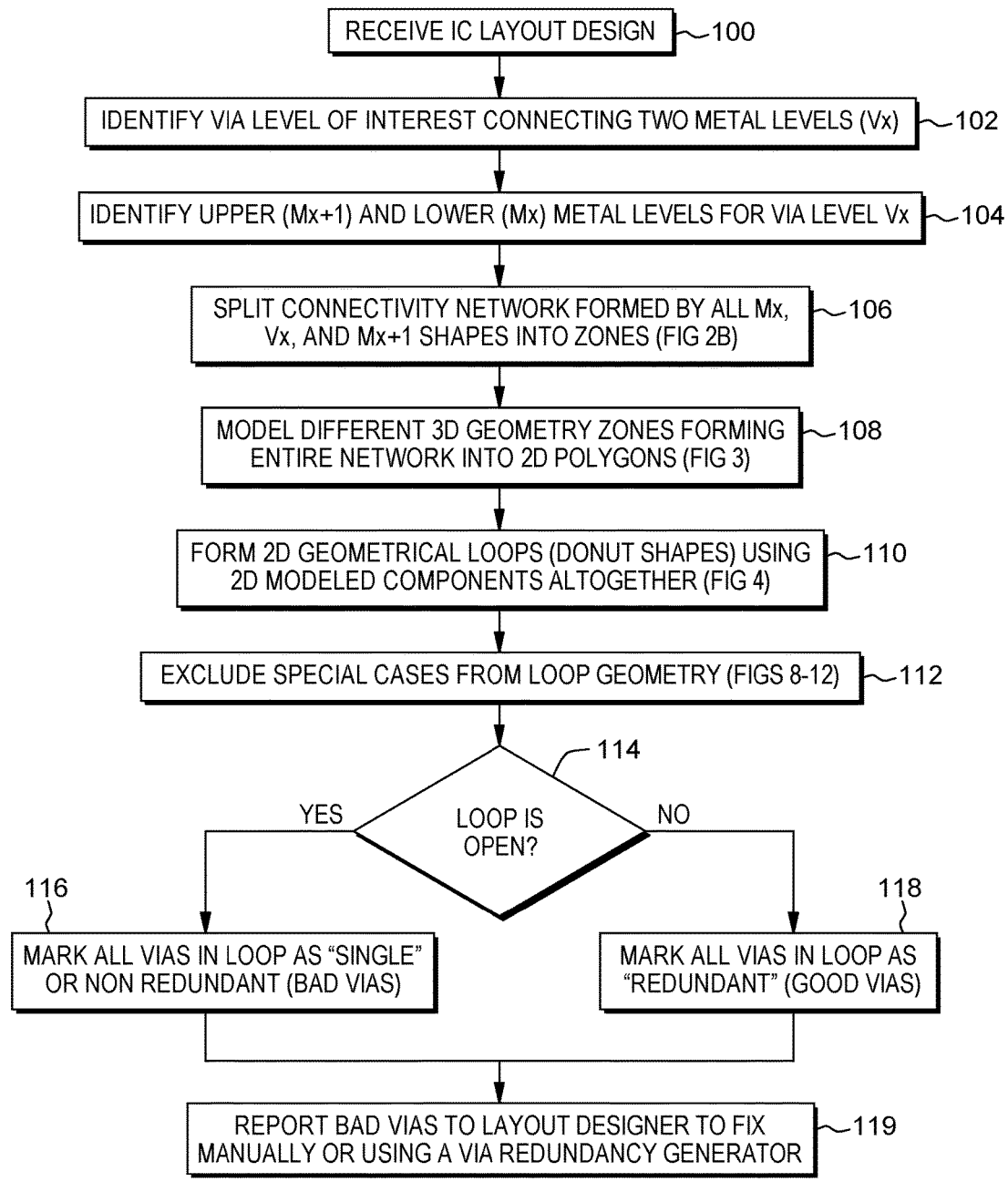
FIG. 1 is a flow diagram illustrating embodiments herein.

FIG. 1 is a flowchart illustrating the operations performed herein. More specifically, in item 100, an integrated circuit (IC) design (that has devices on different layers electrically connected to each other by conductive vias extending between the different layers) is received into an input/output of a computerized device. In item 102, these methods identify the via level of interest, such as one connecting two metal levels (Vx). In item 104, the upper (Mx+1) and lower (Mx) metal levels for via level Vx are identified.

Figure 2A:
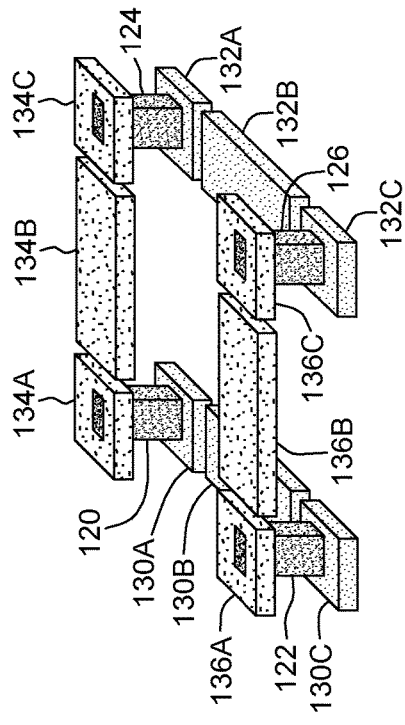
FIGS. 2A-12 are schematic diagrams illustrating the process of forming a 2D representation from a 3D IC design, as performed by embodiments herein.
Figure 2B:
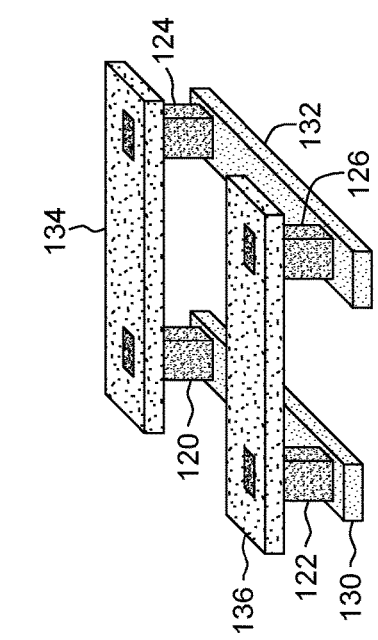
Figure 3:
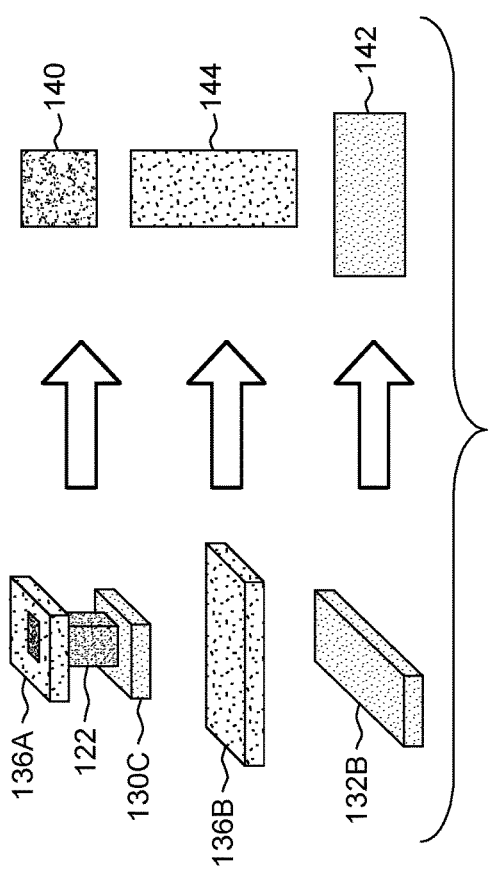
Figure 4:
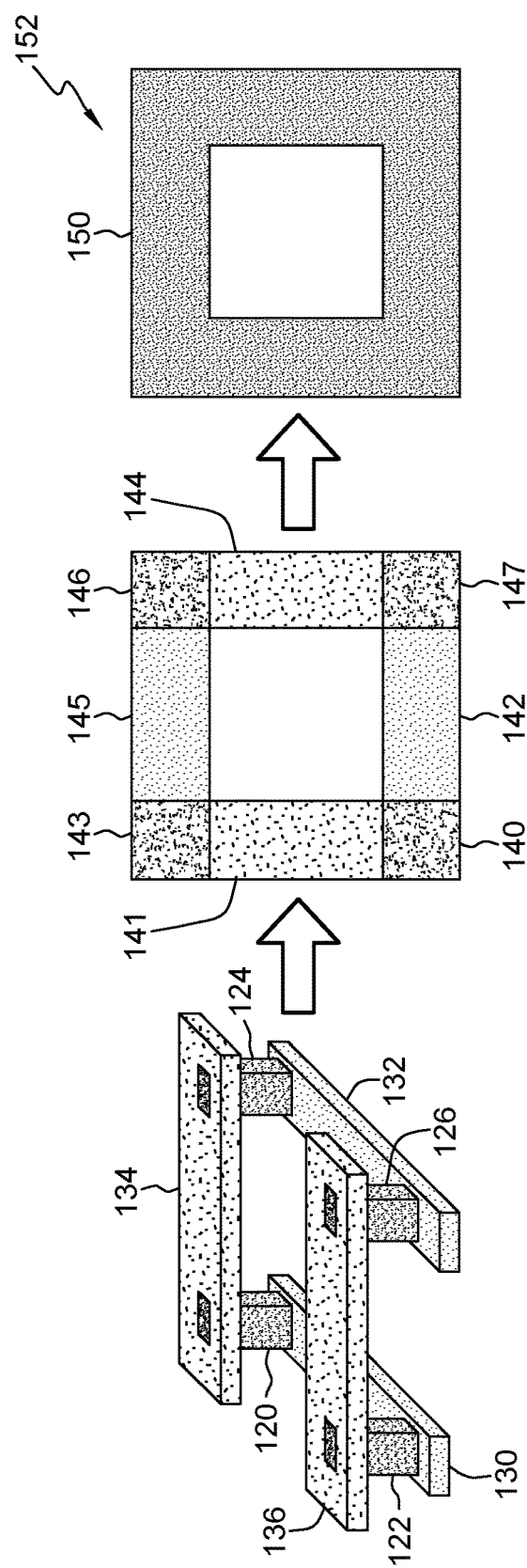

In item 106, such methods split a connectivity network formed by all Mx, Vx, and Mx+1 shapes into zones (and this is shown in FIG. 2B, that is discussed below). Also, in item 108, the different 3D geometry zones forming the entire network are modeled into 2D polygons (and this is shown in FIG. 3, that is discussed below). These methods then form 2D geometrical loops (e.g., donut shapes) using 2D modeled components altogether in item 110 (and this is shown in FIG. 4, that is discussed below). Also, in item 112, the methods herein exclude special cases form loop geometry (and this is shown in FIGS. 8-12, that is discussed below).

Decision element 114 determines whether the 2D geometrical loops are open or closed loops. If so, processing proceeds to item 116, where these methods mark all vias in the loop as "single" or non-redundant (and again these are undesirable bad vias that need to be redesigned); while if the loop is closed processing proceeds to item 118, where the methods mark all vias in the loop as redundant (and again these are desirable good vias that do not need to be redesigned). As output, the non-redundant vias from item 116 are reported to a layout designer to fix manually, or using a via redundancy generator, as shown in item 119.

As noted in item 106, the methods herein split a connectivity network formed by all Mx, Vx, and Mx+1 shapes into zones (e.g., divide the various semiconductor devices (e.g., transistors, capacitors, diodes, etc.) into their constituent conductor components, insulator components, semiconductor components, etc.). This is shown graphically in FIGS. 2A-2B. More specifically, FIG. 2A illustrates a 3D IC design that includes conductive devices 130-136 on different layers of the design electrically connected by vias 120-126. Then, as shown in FIG. 2B, the methods herein divide the various semiconductor devices 130-136 into their constituent conductor components. As shown in FIG. 2B, device 130 is divided into its constituent components 130A-130C, device 132 is divided into its constituent components 132A-130C, device 134 is divided into it's constituent components 134A-134C, and device 136 is divided into it's constituent components 136A-130C.

Further, as noted above, in items 108-110 these methods model the different 3D geometry zones forming the entire network into 2D polygons and form 2D geometrical loops (e.g., donut shapes) using 2D modeled components to identify the locations of just the conductive components of the devices within adjacent layers of the different layers (using a processor of the computerized device), and this is shown in FIGS. 3 and 4. Specifically, in FIG. 3, conductive component 136A, conductive via 122, and conductive component 130C are combined into a single representation then 140; conductive component 136B is transformed into representation 144; and conductive component 132B is transformed into representation 142. As shown more completely in FIG. 4, the various devices 130-136 and vias 120-126 are divided into constituent components 130A-136C, 120-126, and combined into representations 140-147, that are combined into a single rectangular closed-loop geometric shape 150. Therefore, all the constituent components 130A-136C, and vias 120-126 on the different 3D layers are combined into a single closed-loop geometric shape 150 on a single 2D layer as via checker data 152.

As noted, in some examples herein, the conductive components 130A-136C run at right angles to each other (e.g., run parallel and perpendicular to one another) in the different layers, and the vias 120-126 are at the right angle intersections of such conductive components. Alternatively, while the figures show but a few examples, the conductive components could be curved, run diagonally, etc., and the resultant geometric shapes 150 would correspond to such conductive components. The process of identifying the relative locations of the vias 102 and of the conductive components 106 includes aligning the different layers (e.g., aligning two-dimensional (e.g., X-Y) representations of the different adjacent layers) and aligning a corresponding two-dimensional (e.g., X-Y) representation of the conductive vias.

Figure 5E:
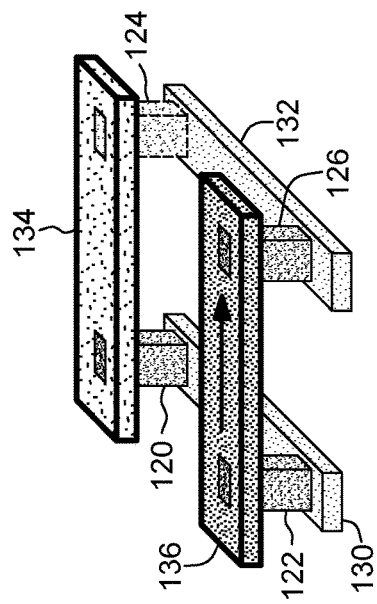
Figure 5F:
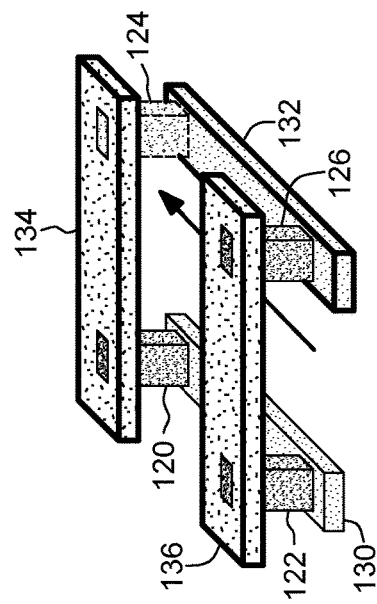
Figure 5G:
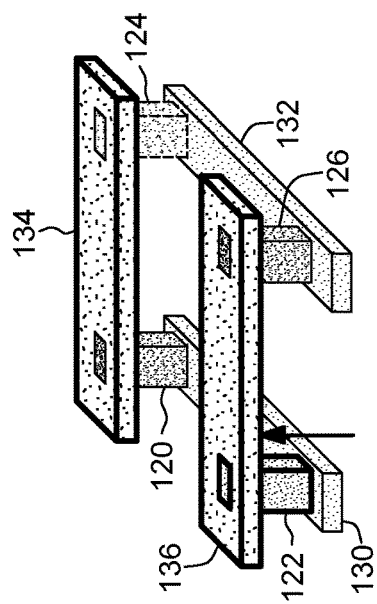

FIGS. 5A-5H demonstrate the process occurring when the methods and systems herein determine which of the conductive components overlap locations of redundant vias, when forming 2D geometrical loops in item 110. More specifically, these methods identify where the conductive components and the conductive vias overlap when the two-dimensional representations of the adjacent layers and the corresponding two-dimensional representation of the conductive vias are all aligned. For example, as shown in FIG. 5A, via 124 may be defective (may not be formed as a functional conductor); however, the processing herein determines whether a redundant alternative conductive path exists, as shown in FIGS. 5B-5H. Therefore, if a via's 124 connecting metals is missed, an alternative path is used. Thus, if a via 124 was not printed, the redundant path 3D configuration (defined as connectivity) will still provide an alternative current path to connect the same MX/MX+1 at this intersection.

Figure 5H:
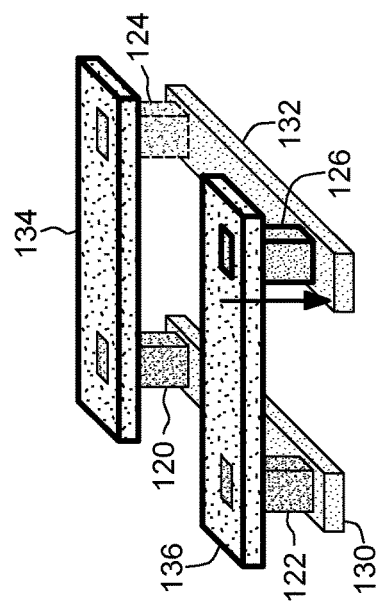

More specifically, such a redundant alternative conductive path (for non-conductive via 124) runs along device 134 (FIG. 5B); via 120 (FIG. 5C); device 130 (FIG. 5D); via 122 (FIG. 5E); device 136 (FIG. 5F); via 126 (FIG. 5G); and finally device 132 (FIG. 5H). Thus, the redundant alternative conductive path, that is identified by systems and methods herein and is shown in FIGS. 5B-5H, electrically connects device 134 to device 132, even with a defective, non-conductive via 124; and such a redundant alternative conductive path uses multiple redundant vias 120, 122, 126. Thus, FIGS. 5A-5H illustrates the meaning of via redundancy, which is having a redundant path to connect two particular nets of Mx (item #132) and Mx+1 (item #134) through a via Vx (item #124). The redundant path is desirable because if via Vx (#124) is missed due to a defect in production, the electric current (electric signal) will still pass through the alternative (redundant) route formed by the path: #134→#120→#130→#122→#136→#126→#132. In other words, the processing herein determines whether the conductors on different levels combined with vias between the different levels form an alternative conductive path for each via. If such a redundant path exists, a 2D closed-loop rectangular geometric representation is produced (indicating redundancy for a via); and if not, only an open-loop of disconnected shapes is produced (indicating a lack of redundancy for a via).

Figure 6:
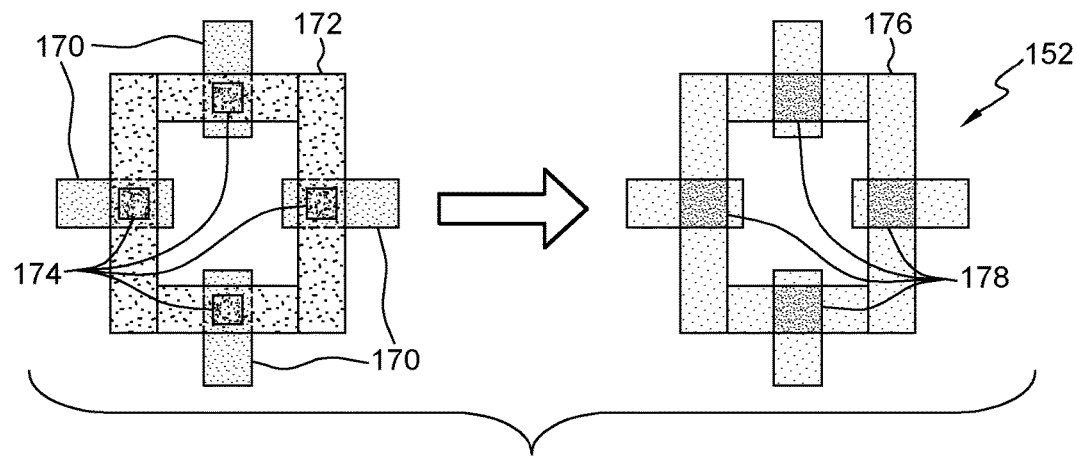

FIG. 6 illustrates a situation where there are not any redundant alternative conductive paths or vias because branching excludes via-to-branch from forming a redundant ring (in the 2D domain). Therefore, in FIG. 6 one layer's conductive components 170 are connected to an adjacent layer's conductive components 172 by conductive vias 174; however, there are not any redundant alternative conductive paths or vias within the adjacent layer's conductive components 170, 172; and the same is included as an open-loop (or lack of a closed loop) component representation 178 (which is a combination of all conductive components and vias in the adjacent layers) shown overlaid on a single 2D representation 176 in the via checker data 152.

Figure 7:
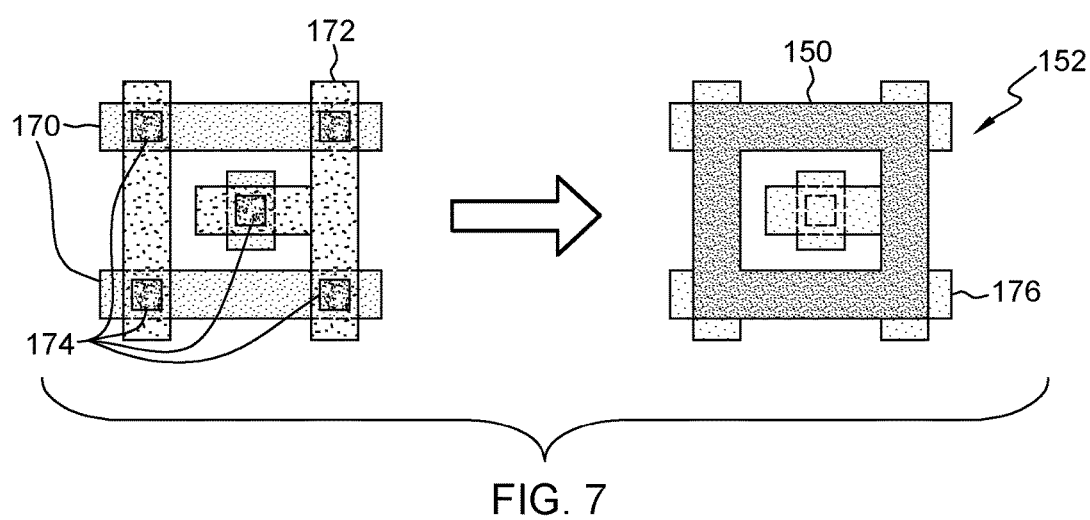

To the contrary, in FIG. 7, the conductive components in the adjacent layers 170, 172 can use redundant vias 174 to form redundant alternative conductive paths, and the redundant paths are shown as the closed-loop geometric shape 150 in FIG. 7 (overlaid on the component representation 176 in the single 2D representation in the via checker data 152). Note that the center via 174 cannot be used to form a redundant alternative conductive path and, therefore, that center via 174 and the conductive component connected thereto are not included in the closed-loop geometric shape 150 in FIG. 7.

Figure 8:
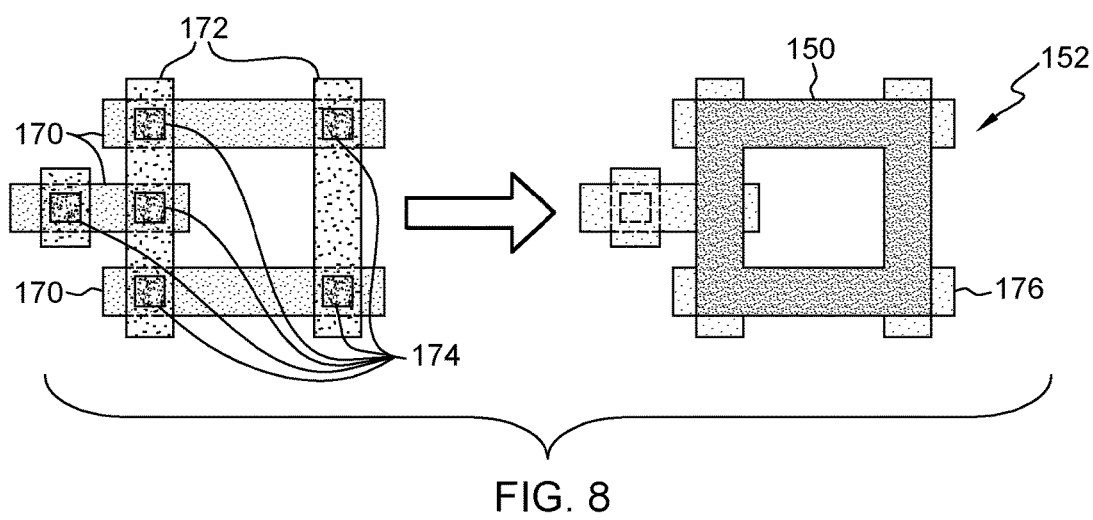

Similarly, in FIG. 8, the conductive components in the adjacent layers 170, 172 can use redundant vias 174 to form redundant alternative conductive paths, and the redundant paths are shown as the closed-loop geometric shape 150 in FIG. 7 (overlaid on the component representation 176 in the single 2D representation in the via checker data 152). Additionally, the left-most via 174 cannot be used to form a redundant alternative conductive path and, therefore, that left-most via 174 and the conductive component connected thereto are not included in the closed-loop geometric shape 150 in FIG. 8.

Figure 9:
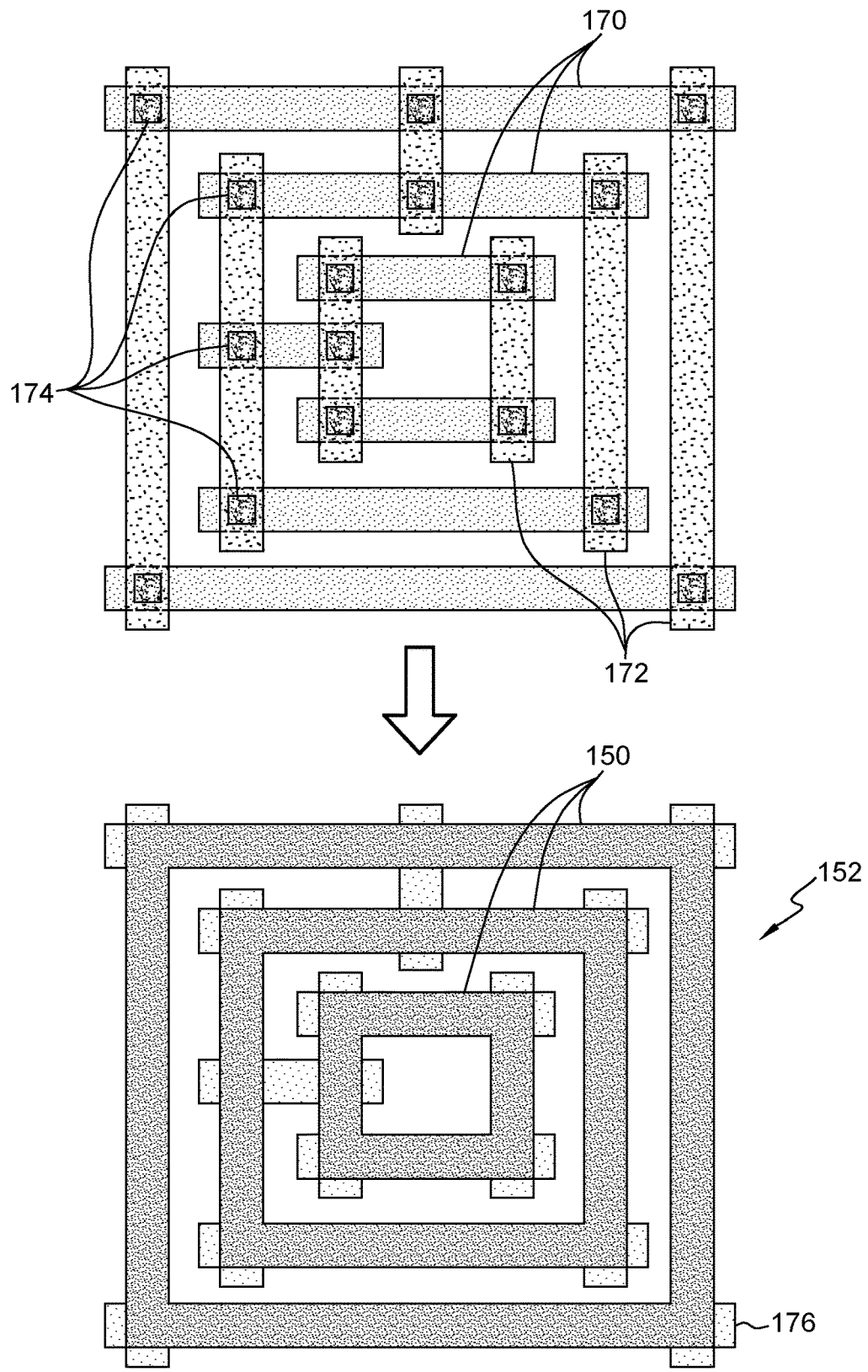
Figure 10:
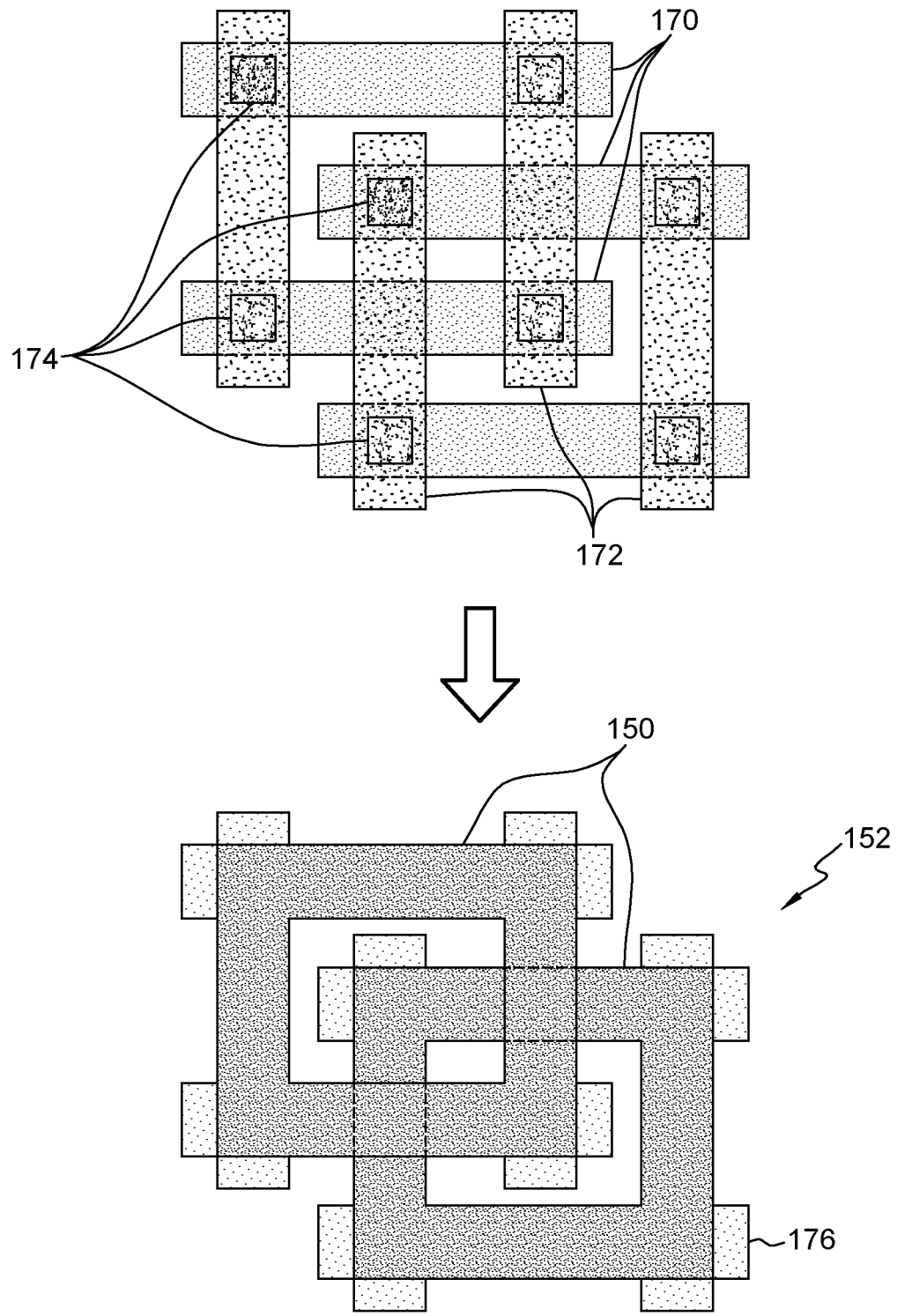

FIGS. 9 and 10 demonstrate that very complex arrangements of conductive components 170, 172 in adjacent layers interconnected by vias 174 can be included in the single 2D representation in the via checker data 152 using multiple different geometric shapes 150 overlaid on the component representation 176. More specifically, FIG. 9 demonstrates an example where the arrangement of the conductive components 170, 172 and vias 174 in the 3D IC design does form redundant alternative conductive paths, but only within concentric squared rings (as shown by the multiple different geometric shapes 150). Note that in FIG. 9, the arrangement of the conductive components 170, 172 and vias 174 in the 3D IC design does not provide redundant conductive paths between the geometric shapes 150, and therefore the 2D via checker data 152 illustrates the geometric shapes 150 as being separated from one another. Further, in FIG. 9, the multiple branching or co-centric rings 150 will not cause false rings.

Similarly, in FIG. 10 the arrangement of the conductive components 170, 172 and vias 174 in the 3D IC design also forms redundant alternative conductive paths, but only within overlapping squared rings (as shown by the multiple different geometric shapes 150). Again, in FIG. 10, the arrangement of the conductive components 170, 172, and vias 174 in the 3D IC design does not provide redundant conductive paths between the geometric shapes 150, and therefore the 2D via checker data 152 illustrates the geometric shapes 150 as being separated from one another (by including gaps in one of the overlapping geometric shapes 150 to show that the overlapping geometric shapes 150 are not connected to one another). Further, the crossing rings 150 are fully isolated (when missing a via at the intersection).

Figure 11:
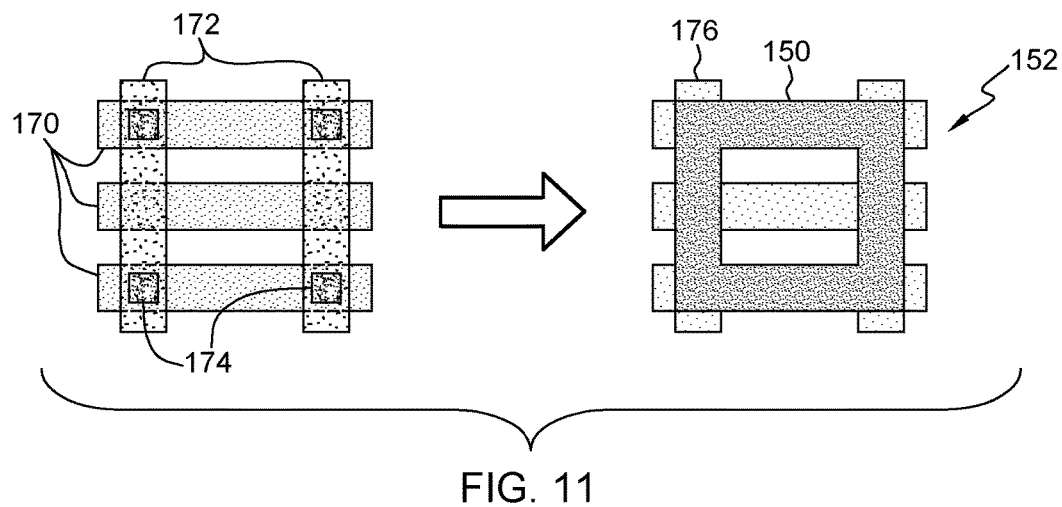
Figure 12:
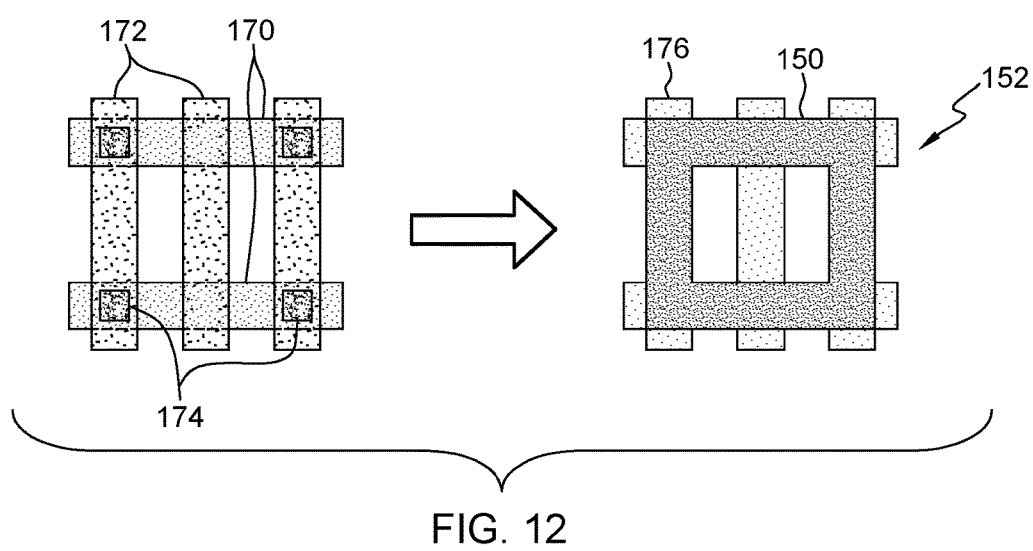

FIGS. 11 and 12 illustrate that some of the portions of the component representation 176 in the 2D via checker data 152 are not utilized in the geometric shapes 150. More specifically, in both FIGS. 11 and 12, the center conductive component (170 in FIG. 11, 172 in FIG. 12) is not connected by any vias 174, and is therefore not included in any of the geometric shapes 150. This demonstrates that passing-over conductors that are not connected are ignored, and that only correct rings will be reported.

The conductors mentioned herein can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, any alloys of such metals, and may be deposited using physical vapor deposition, chemical vapor deposition, or any other technique known in the art.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Figure 13:
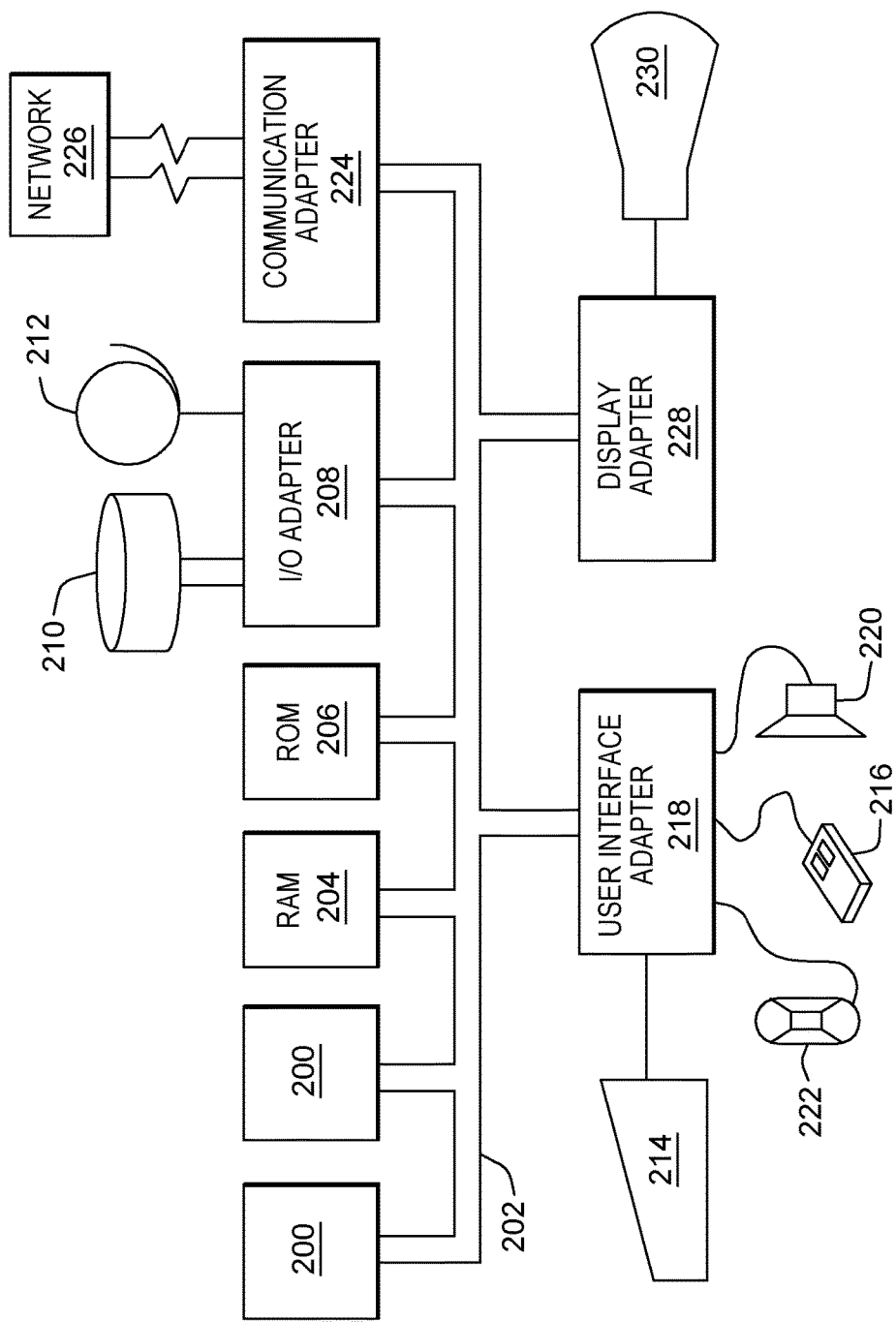
FIG. 13 is a schematic diagram of a hardware system according to embodiments herein.

A representative hardware environment (i.e., a computer system) for implementing the systems, methods and computer program products disclosed above is depicted in FIG. 13. This schematic drawing illustrates a hardware configuration of an information handling/computer system in accordance with the embodiments herein. The system incorporates at least one processor or central processing unit (CPU) 200. The CPUs 200 are interconnected via a system bus 202 to various devices such as a random access memory (RAM) 204, read-only memory (ROM) 206, and an input/output (I/O) adapter 208. The I/O adapter 208 can connect to peripheral devices, such as disk units 210 and tape drives 212, or other program storage devices that are readable by the system. The system can read the inventive instructions on the program storage devices and follow these instructions to execute the methodology of the embodiments herein. The system further includes a user interface adapter 218 that connects a keyboard 214, mouse 216, speaker 220, microphone 222, and/or other user interface devices such as a touch screen device (not shown) to the bus 202 to gather user input. Additionally, a communication adapter 224 connects the bus 202 to a data processing network 226, and a display adapter 228 connects the bus 202 to a display device 230 which may be embodied as an output device such as a monitor, printer, or transmitter, for example.

Therefore, embodiments herein also include a computerized device that includes, among other components, a processor 200, an input/output 208 electrically connected to the processor 200, etc. With devices herein, the input/output 208 receives an integrated circuit (IC) design. Again, the IC design has devices on different layers electrically connected to each other by conductive vias extending between the different layers.

The processor 200 identifies relative locations of the vias and of conductive components of the devices within adjacent layers of the different layers. Once again, the conductive components can run parallel and perpendicular to one another in the different layers. The processor 200 identifies the relative locations of the vias and of conductive components by aligning two-dimensional representations of the adjacent layers and a corresponding two-dimensional representation of the conductive vias.

Also, the processor 200 determines which of the conductive components within the adjacent layers overlap redundant vias of the conductive vias. The processor 200 determines which of the conductive components overlap locations of redundant vias by identifying where the conductive components and the conductive vias overlap when the two-dimensional representations of the adjacent layers and the corresponding two-dimensional representation of the conductive vias are aligned.

With this, the processor 200 generates via checker data of a combination of the adjacent layers that includes closed-loop rectangular geometric shapes representing each instance of the conductive components overlapping redundant vias, and open-loop rectangular geometric shapes (an broken loop of disconnected shapes) that represent each instance of the conductive components failing to overlap redundant vias. Also, the rectangular geometric shapes are different from any shapes used to represent the devices or the vias.

Thus, the rectangular geometric shapes in the via checker data provide data of locations in the IC design that have redundant vias where the loop of the geometric shapes is closed, and an open loop in the rectangular geometric shapes in the via checker data provides data of non-redundant via locations in the IC design, that do not have the redundant vias. The input/output outputs 208 data of such non-redundant via locations to a layout designer, who can manually fix the non-redundant vias, or who can automatically do so, using a via redundancy generator.

Figure 14:
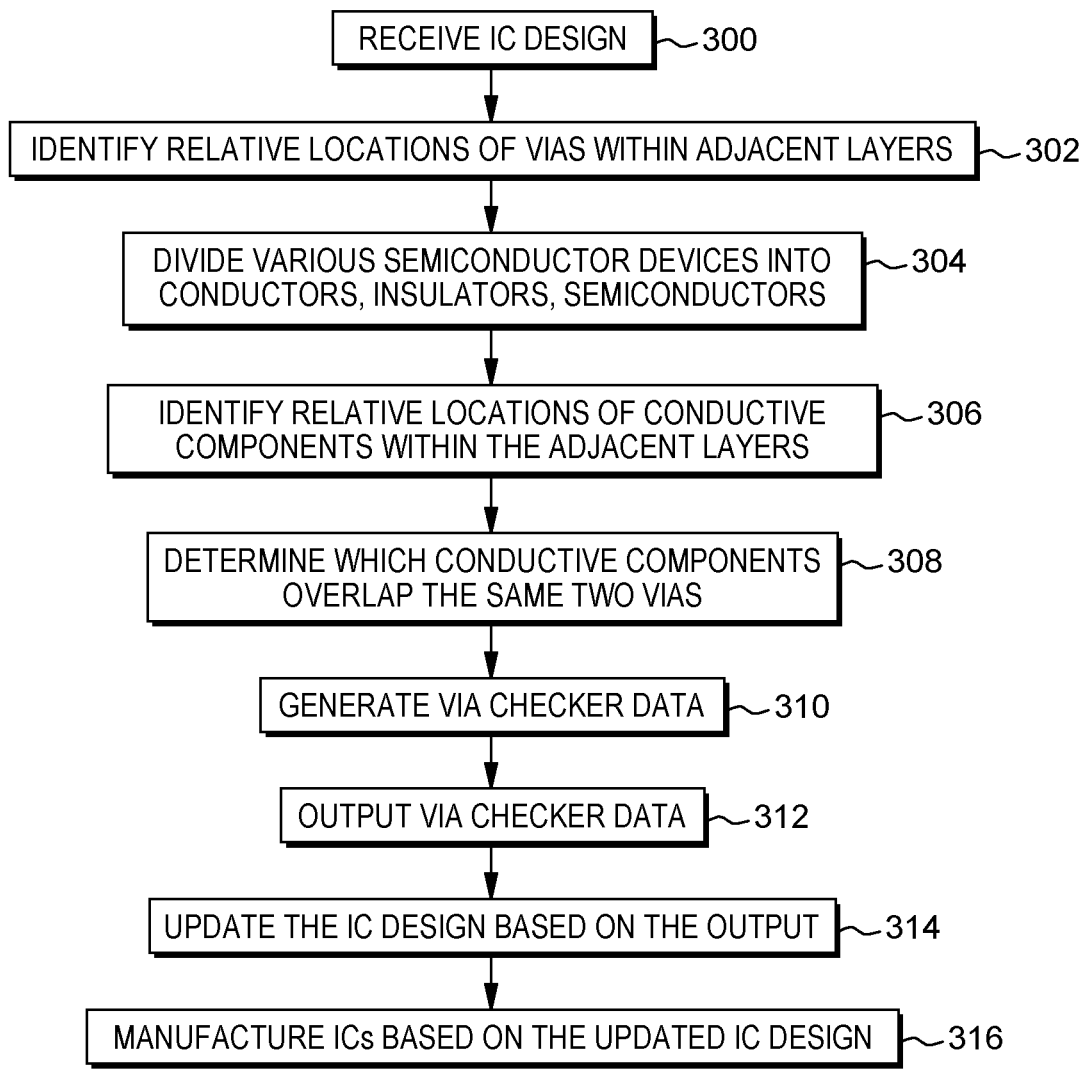
FIG. 14 is a flow diagram illustrating embodiments herein.

FIG. 14 is a flowchart illustrating operations performed by methods and systems herein. As shown in item 300, the various methods herein receive an integrated circuit (IC) design into an input/output of a computerized device. The IC design has devices on different layers electrically connected to each other by conductive vias extending between the adjacent layers.

In item 302, these methods identify relative locations of the vias between two adjacent layers. In item 304, such methods divide the various semiconductor devices (e.g., transistors, capacitors, diodes, etc.) into their constituent conductor components, insulator components, semiconductor components, etc. In item 306, these methods identify the locations of just the conductive components of the devices within adjacent layers of the different layers (using a processor of the computerized device). In some examples, the conductive components run at right angles to each other (e.g., run parallel and perpendicular to one another) in the different layers. The process of identifying the relative locations of the vias 302 and of the conductive components 306 includes aligning two-dimensional (e.g., X-Y) representations of the different adjacent layers, and aligning a corresponding two-dimensional (e.g., X-Y) representation of the conductive vias.

In item 308, such methods determine which of the conductive components within the adjacent layers overlap redundant vias (using the processor). When determining which of the conductive components overlap locations of redundant vias in item 308, these methods identify where the conductive components and the conductive vias overlap when the two-dimensional representations of the adjacent layers and the corresponding two-dimensional representation of the conductive vias are all aligned.

This allows these methods to generate via checker data in item 310 that is a combination of the vias and conductive components within the adjacent layers. The via checker data generated in item 310 includes closed-loop rectangular geometric shapes (an unbroken loop of connected shapes) that represent each instance of the conductive components overlapping redundant vias, and open-loop rectangular geometric shapes (an broken loop of disconnected shapes) that represent each instance of the conductive components failing to overlap redundant vias. Further, the rectangular geometric shapes are different from any shapes used to represent the devices or the vias in the 3D IC design.

In item 312, this via checker data is output from the input/output to a layout designer, who can manually fix the non-redundant vias, or who can automatically do so, using a via redundancy generator. The via checker data is a diagnostic tool, and is not a layer of the IC design and is different from the different layers of the IC design.

Thus, the IC design can be automatically or manually updated (i.e., amended or adjusted) based on the output at item 312 in order to avoid or at least minimize the occurrence of such potential failure patterns, in item 314. The updated IC design can be stored in memory and IC chips can subsequently be manufactured based on that updated IC design, in item 316, in order to minimize device failures.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the foregoing has been described in detail in connection with only a limited number of embodiments, it should be readily understood that the embodiments herein are not limited to such disclosure. Rather, the elements herein can be modified to incorporate any number of variations, alterations, substitutions or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A method comprising:
   receiving an integrated circuit (IC) design into a computerized device, wherein the IC design is of a three-dimensional structure and has devices on different layers electrically connected to each other by conductive vias extending between the different layers;
   identifying relative locations of the conductive vias and of conductive components of the devices within adjacent layers of the different layers to transform the three-dimensional structure into two-dimensional representations;
   determining which of the conductive components within the adjacent layers overlap redundant vias of the conductive vias;
   generating via checker data of a combination of the adjacent layers that includes closed-loop geometric shapes representing each instance of the conductive components overlapping redundant vias, and includes open-loop geometric shapes representing each instance of the conductive components failing to have overlapping redundant vias; and
   outputting the via checker data, wherein the open-loop geometric shapes provide data of locations in the IC design that fail to have the redundant vias.

2. The method according to claim 1, wherein the identifying relative locations of the conductive vias and of conductive components comprises aligning two-dimensional representations of the adjacent layers and a corresponding two-dimensional representation of the conductive vias.

3. The method according to claim 2, wherein the determining which of the conductive components overlap locations of redundant vias comprises identifying where the conductive components and the conductive vias overlap when the two-dimensional representations of the adjacent layers and the corresponding two-dimensional representation of the conductive vias are aligned.

4. The method according to claim 1, wherein the closed-loop geometric shapes comprise an unbroken loop of connected shapes where there are redundant vias, and
   wherein the open-loop geometric shapes comprise a broken loop of disconnected shapes where there are not redundant vias.

5. The method according to claim 1, wherein the closed-loop geometric shapes and open-loop geometric shapes are different from any shapes used to represent the devices or the conductive vias.

6. The method according to claim 1, further comprising removing known shapes from the via checker data.

7. The method according to claim 1, wherein the via checker data is not a layer of the IC design and is different from the different layers of the IC design.

8. A method comprising:
   receiving an integrated circuit (IC) design into an input/output of a computerized device, wherein the IC design is of a three-dimensional structure and has devices on different layers electrically connected to each other by conductive vias extending between the different layers;

identifying relative locations of the conductive vias and of conductive components of the devices within adjacent layers of the different layers to transform the three-dimensional structure into two-dimensional representations using a processor of the computerized device, wherein the conductive components run parallel and perpendicular to one another in the different layers;

determining which of the conductive components within the adjacent layers overlap redundant vias of the conductive vias using the processor;

generating via checker data of a combination of the adjacent layers that includes closed-loop rectangular geometric shapes representing each instance of the conductive components overlapping redundant vias, and includes open-loop rectangular geometric shapes representing each instance of the conductive components failing to have overlapping redundant vias, using the processor; and outputting the via checker data from the input/output, wherein the open-loop rectangular geometric shapes in the via checker data provides data of locations in the IC design that fail to have redundant vias.

9. The method according to claim 8, wherein the identifying relative locations of the conductive vias and of conductive components comprises aligning two-dimensional representations of the adjacent layers and a corresponding two-dimensional representation of the conductive vias.

10. The method according to claim 9, wherein the determining which of the conductive components overlap locations of redundant vias comprises identifying where the conductive components and the conductive vias overlap when the two-dimensional representations of the adjacent layers and the corresponding two-dimensional representation of the conductive vias are aligned.

11. The method according to claim 8, wherein the closed-loop rectangular geometric shapes comprise an unbroken loop rectangular of connected shapes where there are redundant vias, and
wherein the open-loop rectangular geometric shapes comprise a broken loop rectangular of disconnected shapes where there are not redundant vias.

12. The method according to claim 8, wherein the closed-loop rectangular geometric shapes and open-loop rectangular geometric shapes are different from any shapes used to represent the devices or the conductive vias.

13. The method according to claim 8, further comprising removing known shapes from the via checker data.

14. The method according to claim 8, wherein the via checker data is not a layer of the IC design and is different from the different layers of the IC design.

15. A computerized device comprising:
a processor; and
an input/output electrically connected to the processor,
wherein the input/output receives an integrated circuit (IC) design, wherein the IC design is of a three-dimensional structure and has devices on different layers electrically connected to each other by conductive vias extending between the different layers, wherein the processor identifies relative locations of the conductive vias and of conductive components of the devices within adjacent layers of the different layers to transform the three-dimensional structure into two-dimensional representations, wherein the conductive components run parallel and perpendicular to one another in the different layers, wherein the processor determines which of the conductive components within the adjacent layers overlap redundant vias of the conductive vias, wherein the processor generates via checker data of a combination of the adjacent layers that includes closed-loop rectangular geometric shapes representing each instance of the conductive components overlapping redundant vias, and includes open-loop rectangular geometric shapes representing each instance of the conductive components failing to have overlapping redundant vias, wherein the input/output outputs the via checker data, and wherein the open-loop rectangular geometric shapes in the via checker data provide data of locations in the IC design that fail to have redundant vias.

16. The computerized device according to claim 15, wherein the processor identifies the relative locations of the conductive vias and of conductive components by aligning two-dimensional representations of the adjacent layers and a corresponding two-dimensional representation of the conductive vias.

17. The computerized device according to claim 16, wherein the processor determines which of the conductive components overlap locations of redundant vias by identifying where the conductive components and the conductive vias overlap when the two-dimensional representations of the adjacent layers and the corresponding two-dimensional representation of the conductive vias are aligned.

18. The computerized device according to claim 15, wherein the closed-loop rectangular geometric shapes comprise an unbroken loop rectangular of connected shapes where there are redundant vias, and
wherein the open-loop rectangular geometric shapes comprise a broken loop rectangular of disconnected shapes where there are not redundant vias.

19. The computerized device according to claim 15, wherein the rectangular geometric shapes are different from any shapes used to represent the devices or the conductive vias.

20. The computerized device according to claim 15, further the processor removes known shapes from the via checker data.

* * * * *